United States Patent [19]
Zabinski et al.

[11] Patent Number: 4,882,961
[45] Date of Patent: Nov. 28, 1989

[54] CUTTING PORTAL OF AN ULTRA-HIGH PRESSURE FLUID JET CUTTING SYSTEM

[75] Inventors: Siegfried Zabinski, Bielefeld; Klaus Biervert, Spenge; Gerd Küpper, Bad Salzuflen, all of Fed. Rep. of Germany

[73] Assignee: Durkopp Systemtechnik GmbH, Fed. Rep. of Germany

[21] Appl. No.: 115,430

[22] Filed: Oct. 30, 1987

[30] Foreign Application Priority Data

Nov. 5, 1986 [DE] Fed. Rep. of Germany ....... 3637617

[51] Int. Cl.$^4$ .............................................. B26F 3/00
[52] U.S. Cl. ........................................ 83/177; 83/936
[58] Field of Search ............. 83/53, 177, 71, 925 CC; 384/41, 59, 42

[56] References Cited

U.S. PATENT DOCUMENTS

| | | | |
|---|---|---|---|
| 4,171,657 | 10/1979 | Halberschmidt et al. ..... | 83/925 CC X |
| 4,468,160 | 8/1984 | Campbell, Jr. ............ | 83/925 CC X |
| 4,620,466 | 11/1986 | Jumel et al. ............. | 83/177 |

FOREIGN PATENT DOCUMENTS 2057956 4/1981 United Kingdom ........... 83/925 CC

OTHER PUBLICATIONS

Niemann Maschinenelemente, 2nd Edition, vol. 1, Springer Verlag, Berlin, 1981, pp. 84 to 95.

Primary Examiner—Frank T. Yost
Assistant Examiner—Eugenia A. Jones
Attorney, Agent, or Firm—Ostrolenk, Faber, Gerb & Soffen

[57] ABSTRACT

A cutting portal for an ultra-high-pressure fluid jet cutting system separates the longitudinal and transverse motion of the cutting head support. The portal includes two parallel plates with lightweight, honeycomb composite material between them. The cutting portal is moved transversely of its length longitudinally of the cutting table. A guide rail for the cutting head support is supported in the honeycomb material and extends along the length of the cutting portal, transversely to the motion of the cutting portal. Spaced apart bearing shafts are supported by bearing shells in the honeycomb material. A driven belt passes around the shafts and moves the cutting head support along the guide rail, which provides motion of the cutting jet in the transverse direction of the cutting table.

9 Claims, 3 Drawing Sheets

CUTTING PORTAL OF AN ULTRA-HIGH PRESSURE FLUID JET CUTTING SYSTEM

BACKGROUND OF THE INVENTION

The present invention concerns the cutting portal of an ultra-high pressure fluid jet cutting system. To be able to cut material, the cutting jet of a fluid jet cutting system must be freely movable in all directions in a plane parallel to the cutting table. These two degrees of freedom are uncoupled so that one is associated with the cutting portal and the other is associated with the cutting-head support.

The cutting portal is mounted to be displaceable in the longitudinal direction of the cutting table and carries the actual cutting device, namely the cutting-head support. The cutting head support is in turn mounted for displacement in the transverse direction of the cutting table.

The entire weight of the cutting portal is an important parameter for establishing the average cutting speed on the system. For high speeds, smaller masses need be accelerated.

SUMMARY OF THE INVENTION

The object of the invention is to provide a cutting portal for an ultra-high pressure fluid jet cutting system which is of high stability, yet is of low weight.

Another object of the invention is to have the bearing plates, which are required for the transverse displacement of the cutting head arranged thereon, be integral components.

A further object of the invention is to be able to increase the cutting speed.

According to the invention, the cutting portal for the ultra-high-pressure fluid jet cutting system obtains an increase in its cutting speed and is weight optimized through the cutting portal being formed of plates between which a honeycomb-structured, light-weight, composite material is disposed. Within this material are positioned the bearing shells for the spaced apart bearing shafts for the drive of the cutting head support. Further, a guide rail for guiding the movement of the cutting head support is also attached through couplings into the honeycomb material. The honeycomb material of the cutting portal therefore supports the major components.

The bearing shells are formed by sleeves passing through the portal, through the honeycomb material and through the plates and define bearings for the shafts. A belt extends between the shafts to move the cutting head support along the guide rail and the cutting portal. The cutting portal itself is movable over the cutting table transverse to its long dimension. In that way, the cutting jet may be moved across the cutting table both longitudinally and transversely for effecting a cut.

In a preferred arrangement, the bearing shells for the bearing shaft are comprised of two-piece sleeves, with one piece inserted into the honeycomb material from the respective opposite plate. Preferably, one piece of each sleeve is approximately twice as long as the other piece so that the total length of the bearing sleeve is divided into pieces with a length ratio of 1 to 2.

Other objects and features of the invention are explained in further detail with reference to the accompanying drawings.

DESCRIPTION OF A PREFERRED EMBODIMENT

Figure 1:
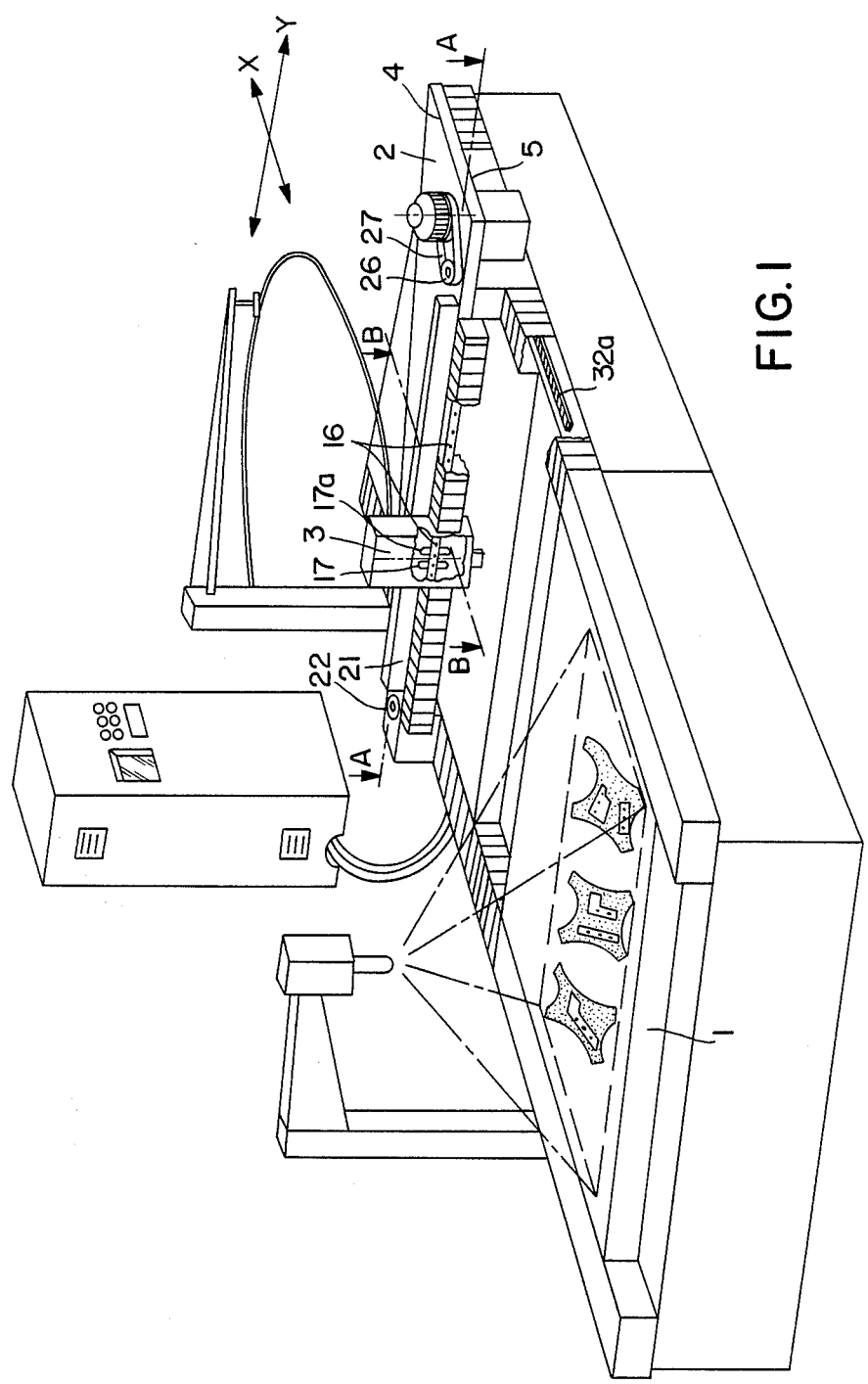
FIG. 1 shows the entire ultra-high-pressure fluid jet cutting system in perspective.

FIG. 1 shows an ultra-high-pressure fluid cutting system.

The cutting portal 2 is mounted on the cutting table 1 on two racks (one of these is shown at 32a) so that it can be displaced in longitudinal direction. The cutting portal 2 carries the cutting-head support 3, which is arranged for transverse displacement on the cutting portal. Drive in both the longitudinal and the transverse directions is carried out via play-free transmissions and disk-armature motors.

During a cutting pass, a pattern, which at times may be relatively complicated and may have numerous curves, must be followed. In order to achieve the highest average cutting speed of the system, the masses to be accelerated must be small. For this reason, the cutting portal 2 is comprised of two thin plates 4, 5 which are spaced apart from each other. The space between those plates is filled with a honeycomb-like composite material 6. Such a composite material is known as "honeycomb" and is used, for instance, in vehicles for air and space travel. In order to increase its stability, the cutting portal 2 advantageously has a trapezoidal shape, as seen in top view. A reinforcement in the form of a strip 21, also comprised of composite material, is applied along the Y axis.

Figure 2:
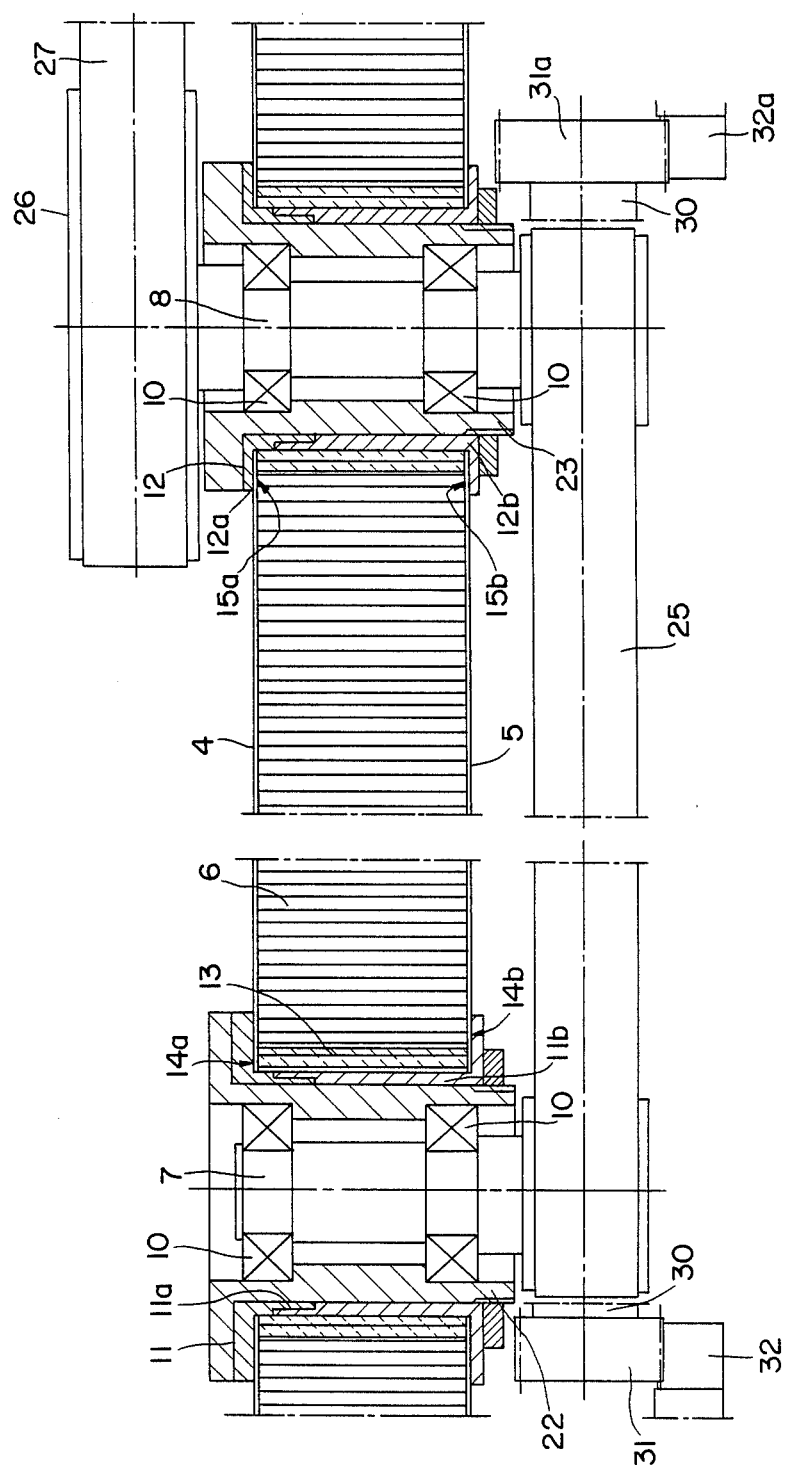
FIG. 2 is a section through the cutting portal along the line A—A.

FIG. 2 is a section along the line A—A of FIG. 1. The shafts 7, 8 necessary for the transverse displacement of the cutting head support 3 are rotatably supported in bearing housings 22, 23 that are indirectly supported in the honeycomb structure 6 of the cutting portal 2. The bearing housings 22, 23 are pressed into bearing shells 11, 12. Those shells are assembled from two-piece sleeves 11a, 11b and 12a, 12b. Each two-piece sleeve 11a, 11b and 12a, 12b is preferably divided so that one piece is approximately twice the length of the other piece, so and the sleeve pieces of each sleeve have a length ratio of about 1 to 2. The sleeve pieces are installed from opposite respective sides or plates of the cutting portal. The sleeve pieces are firmly bonded to the honeycomb structure 6 by a plastic cement 13. The sleeve parts 11a, 11b and 12a, 12b are provided on their outer ends with radial collars 14a, 14b and 15a, 15b respectively, which lie on the plates 4 and 5 respectively.

The bearing shells 11, 12 are inserted perpendicular to the plates 4, 5 and thus extend parallel to the honeycomb structure 6.

The inside diameter d of the bearing shells 11, 12 must be of such size that flexural forces resulting from the drive do not lead to a deformation of the plates 4, 5. The drive shaft 7 is connected to the drive shaft 8 via a toothed belt 25 (for clarity, not shown in FIG. 1) to which the cutting-head support 3 (not shown in FIG. 2) is fastened. Depending upon the direction of rotation of the toothed belt 25, the cutting-head holder 3 is moved to the left or right in FIG. 2. The shaft 7 is arranged eccentrically in the bearing housing 22 so that the tension of the toothed belt 25 can be adjusted by it.

The bearing housing 22 can have a plurality of passage openings (not shown in detail) which, without affecting the strength, help satisfy the need for a light construction. On the drive shaft 8 there is fastened a gear 26 which is operatively connected via the toothed belt 27 to a disk-armature motor (not shown).

Both shafts 7, 8 together with the parts surrounding them (shaft bearing 10, bearing housings 22, 23) are advantageously arranged in the bearing shells 11, 12 so that, in case of need, the complete unit can be replaced without disassembling the cutting portal 2.

Figure 3:
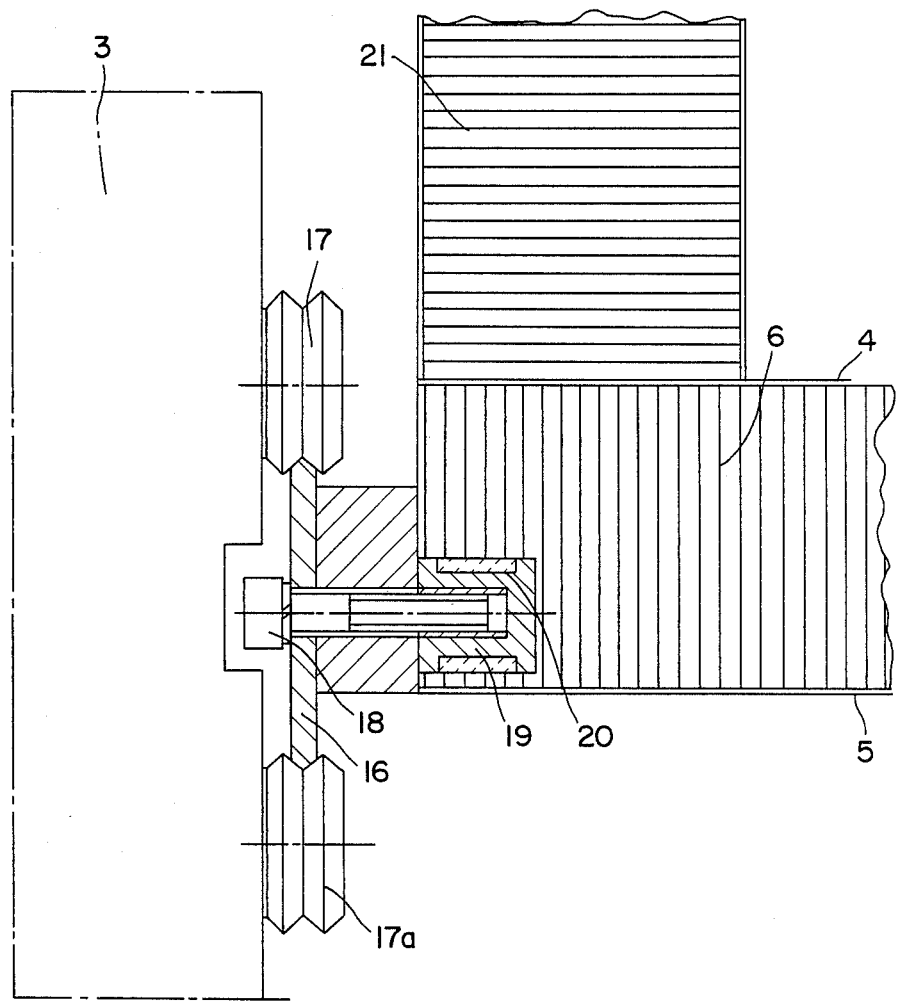
FIG. 3 is a partial section through the cutting portal along the line B—B.

FIG. 3 shows a partial section along the line B—B. The transverse displacement of the cutting-head support 3 takes place along a guide rail 16 which is fastened laterally on the cutting portal 2. The cutting-head support 3 travels, via rollers 17, 17a fastened thereon, on the guide rail 16 which is fastened by a plurality of screws 18 directly in the honeycomb structure 6 of the composite material, perpendicular to the course of the honeycomb. The screws 18 engage into threaded couplings 19. The couplings are inserted, parallel to the plates 4, 5, into the honeycomb structure 6 and are bonded to the honeycomb by an epoxy resin 20.

In order to assure a secure attachment it is important to provide in the side of the cutting portal 2, which in itself is not capable of bearing load, a plurality of holes of a larger diameter than the outside diameter of the threaded coupling 19 and to fill those holes with epoxy resin. A threaded coupling 19 is then introduced into each of the holes and is held fast until the epoxy resin has hardened. It is also conceivable to obtain a dependable attachment by filling the holes with plastic cement and, after that hardens, to cut threads coaxially to the original holes, into which threaded inserts (not shown in detail) can be screwed.

Referring again to FIG. 2, in order to make certain that both sides of the cutting portal 2 are pushed exactly parallel to each other in the longitudinal direction over the supporting cutting table 1, there is arranged on the cutting portal 2 a compensating shaft 30, which is developed as a torsion shaft having ends which are provided with pinions 31, 31a which engage in the racks 32, 32a arranged on the cutting table, as shown in the partial view of FIG. 2.

As compared with previous cutting portals of structural steel, this one formed of composite material is lighter by more than a factor of ten, so that, with equivalent rapidity, substantially greater acceleration is obtained, and this results in a substantial shortening of the cutting time for the cutting of material.

Although the present invention has been described in connection with a preferred embodiment thereof, many variations will now become apparent to those skilled in the art. It is preferred, therefore, that the present invention be limited not by the specific disclosure herein, but only by the appended claims.

What is claimed is:

1. A cutting portal for a high-pressure fluid jet cutting system, comprising:
    a cutting table; the cutting portal being disposed on the cutting table and being movable along the cutting table transversely to a lengthwise direction of extension of the cutting portal;
    the cutting portal comprising two thin plates spaced apart from each other and having a lengthwise dimension extending in the lengthwise direction of extension of the cutting portal; a honeycomb material being disposed between the thin plates for defining the cutting portal together with the plates;
    a first bearing shell and a second bearing shell disposed in the cutting portal and spaced apart from each other along the cutting portal; the bearing shells being introduced perpendicular to the surface of the thin plates into the honeycomb material, and the bearing shells being connected to the honeycomb material; a first bearing shaft and a second bearing shaft each being supported in a respective one of the bearing shells;
    a guide rail extending along the lengthwise direction of extension of the cutting portal, and means extending from the guide rail into the honeycomb material for supporting the guide rail to the honeycomb material;
    a cutting head support for supporting the fluid jet; the cutting head support being supported to move along the guide rail along the length dimension of the cutting portal and the plates;
    means supported on the bearing shafts and connected with the cutting head support for moving across the space between the bearing shafts and thereby moving the cutting head support along the length of the cutting portal.

2. The cutting portal of claim 1, wherein the plates of the cutting portal are arranged parallel to each other.

3. The cutting portal of claim 1, wherein the bearing shells comprise sleeves which extend through the cutting portal, and through and between the plates.

4. The cutting portal of claim 3, wherein each sleeve is comprised of two parts, one part installed into the honeycomb material from one plate and the other part installed into the honeycomb material from the other plate.

5. The cutting portal of claim 4, wherein the two part sleeves of the bearing shells are divided such that one part of each sleeve is approximately twice the length of the other part of the same sleeve.

6. The cutting portal of claim 3, wherein each bearing shell further including bearings for supporting within it the respective bearing shaft supported in said bearing shell and the bearing shafts being rotatable in the bearings.

7. The cutting portal of claim 6, wherein the means for moving the cutting head support comprises a belt supported to be moved by and between the bearing shafts, and means for rotating one of the shafts for moving the belt.

8. The cutting portal of claim 1, wherein the means extending from the guide rail comprises couplings extending from the guide rail into the honeycomb material along a direction parallel to the surface of the plates.

9. The cutting portal of claim 8, wherein the couplings for the guide rail are threaded couplings and means are provided on the guide rail for being threaded into the threaded couplings.

* * * * *